April 10, 1951  G. T. KURTZ ET AL  2,548,029
PLASTIC COATED ROOFING
Filed Jan. 3, 1947
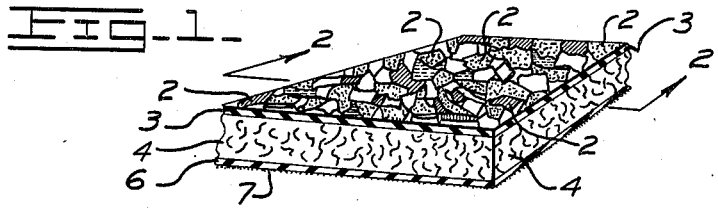
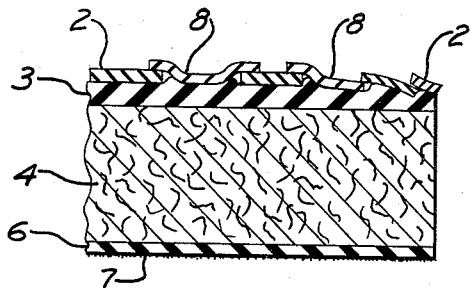 
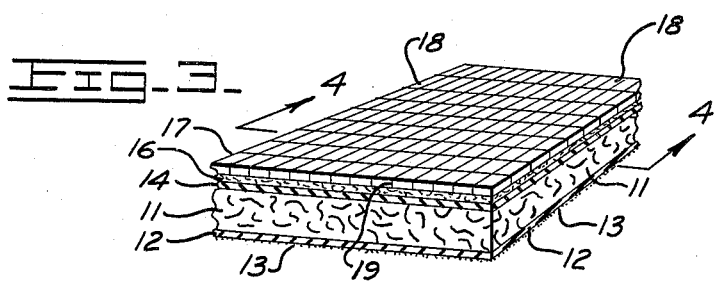
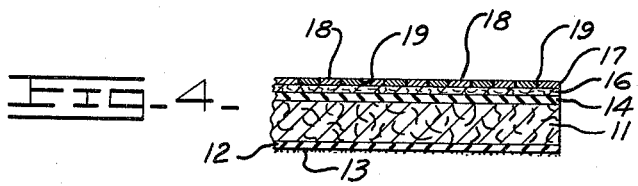
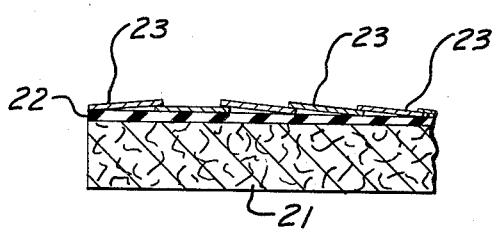 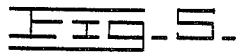
INVENTOR.
GERALD T. KURTZ AND
FRANK O. GROCH, JR.
BY Charles M Fryer
ATTORNEY.

Patented Apr. 10, 1951

2,548,029

UNITED STATES PATENT OFFICE 2,548,029

PLASTIC COATED ROOFING

Gerald T. Kurtz, Piedmont, and Frank O. Groch, Jr., Berkeley, Calif., assignors to Pabco Products Inc., a corporation of Delaware Application January 3, 1947, Serial No. 719,968

5 Claims. (Cl. 117—30)

Our invention relates to sheet material having a decorative coating adhesively united thereto, and to a resinous or plastic coating composition as the decorative coating.

Our invention is particularly adapted to roofing material which is well known and generally comprises a flexible fibrous sheet base impregnated and also coated on one or both sides with bituminous material, to one side of which is usually adhesively united a surface layer or coating of decorative and weather resistant material. However, our invention is also applicable to other forms of covering or decorative material wherein it may be desirable to have a decorative surface coating adhesively united thereto.

With respect to roofing material, both in elongated sheet form and in the form of pre-cut shingles, it is important for long life of the roofing that the aforementioned decorative coating therefor also have superior weather and wear resistant properties. Many materials have been and are used for this purpose, such as slate or other mineral granules usually provided with some form of colored coating; metallic sheets, flakes or powder; specially treated mica flakes, etc. Modern synthetic resinous or plastic materials and some natural resinous materials, such as shellac, have properties which lend themselves readily to this purpose, as they are weather resistant and highly decorative in the color that can be imparted thereto.

However, the use of these plastic materials has heretofore been impractical because when applied to the roofing in the manner which one would normally employ because of the character thereof, namely in the form of a liquid coating composition to form a continuous solid plastic coating over the roofing, undesirable results occur. The continuous plastic coating film cracks upon being subjected to weathering, and forms markings similar in appearance to the skin of an alligator, which effect is hence called "alligatoring" in the trade. When moisture collects under the plastic coating film through the cracks, so-called "blistering" occurs; and furthermore the continuous film has a tendency to pull away from the bituminous coating of the roofing to which it is adhesively united.

These tendencies are lessened in the roofing of U. S. patent to Giles, No. 2,094,150, September 28, 1927, because of the use of mineral granules under a continuous coating film of lacquer having a thermosetting base in the vehicle; alkyd resins being also disclosed. However, in this product, the granules form an essential part of the surface covering or coating.

Our invention is designed to overcome the aforementioned problems with respect to resinous or plastic surface coatings for material of the class described; and it has as its objects, among others, the provision of an improved form of resinous or plastic surface coating adapted for covering a base material of the character related, and which is highly decorative, of relatively light weight, can be adhesively united to such base without subsequent material separation therefrom, has superior weather resistant properties, and which can be economically manufactured and applied. Other objects and advantages of our invention will become apparent from a perusal of the following description thereof.

Referring to the drawings:

Fig. 1 is a fragmentary isometric view of a portion of conventional flexible sheet roofing embodying a preferred embodiment of our invention; some of the parts in this and the other views of the drawings being shown exaggerated and out of proportion to illustrate more clearly the invention;

Fig. 2 is an enlarged section taken in a plane indicated by line 2—2 in Fig. 1;

Fig. 3 is a view similar to Fig. 1 of like roofing incorporating another embodiment of our invention.

Fig. 4 is an enlarged section taken in a plane indicated by line 4—4 in Fig. 3; and Fig. 5 is an enlarged sectional view of a sheet of ornamental fabric embodying our invention.

In general, we have found that a resinous or plastic material may be adhesively united to a base material, such as the usual fibrous roofing or the like, and remain united thereto without substantial subsequent separation therefrom, if such plastic is in the form of divided substantially solidified particles; and such plastic material will provide a highly ornamental, as well as weather resistant surface coating which consists essentially of such divided or separate plastic particles. In this state, there are none of the aforesaid disadvantages which obtain with respect to application of a substantially continuous film of such plastic to the base.

The plastic is preferably of the synthetic resin type, and may be in the form of granules similar in size and shape to slate or other mineral granules now usually employed as surfaces for roofing; and they can be adhesively united to the roofing in the conventional manner employed for application of mineral granules or other surfacing particles to roofing. These plastic granules may be formed in any suitable manner. A convenient way is to prepare them from a solidified mass of the parent plastic material, such as by crushing or grinding, and screening out particles of undesired size. In this connection, the plastic may be employed in the form of particles all of a relatively uniform size or of varying size.

As indicated in Figs. 1 and 2 illustrating a preferred embodiment of our invention, we prefer to employ the plastic particles in the form of relatively thin flexible flakes 2. As with respect to other roofing surfacing materials heretofore employed, these flakes are adhesively united in bituminous coating 3 of asphalt over the usual flexible felt base fabric 4 which is saturated with bituminous material; the base being usually provided with an undercoating 6 of asphalt bituminous material thinner than coating 3. Such undercoating is usually coated with a light so-called "back-finish" covering 7 of non-dusty finish material, such as fine quartz sand, or mica.

The relatively thin flake material is preferred to the granules because by virtue of the flakes the particles can be caused to overlap or bridge each other as illustrated in Fig. 2, thus insuring substantially complete coverage. Also in the form of relatively thin flakes, flexibility of the material is enhanced. As a result, the bridging particles of the surface covering, as indicated, for example by reference number 8, can be more readily depressed or bent intermediate their edges by the usual pressing rolls through which the sheet is passed after the surfacing material has been applied thereto, and thus cooperate with a temporary softening effect on the plastic, to be subsequently explained, for insuring firm adhesive bonding in the asphalt coating 3.

Any of the well known methods now commonly employed for applying present mineral granules or other surfacing particles, to fibrous base roofing may be employed for applying the described plastic particles of our invention to such roofing. A common method and one which we prefer, comprises sprinkling an excess of the plastic particles on adhesive bituminous coating 3 while it is still hot enough (about two hundred and fifty (250° F.) to three hundred and fifty (350° F.) Fahrenheit) so as to be soft and in adhesive condition, such as by depositing the particles from a shaker screen as the coated roofing is moved past it; passing the sheet through the usual cool pressing rolls which are adjusted to perform a light pressing operation sufficient to cause firm imbedding or adhesion of the plastic particles in coating 3; and removing non-adherent particles of the plastic, preferably by brushing them off with conventional brushing rolls.

In this connection, the flexibility of the plastic flakes is temporarily increased by a slight softening thereof which results from the heat of coating 3 as the flakes are applied. This effect is important in causing substantially all the flakes, particularly the bridging or overlapping flakes 8 illustrated in Fig. 2, to be readily forced down into coating 3 by the pressing rolls. Hence, all the flakes will be caused to take a permanent set in coating 3 which will remain upon solidification of such coating at ordinary temperatures.

The plastic in flake form may be obtained in any suitable manner. One simple and easy way is first to mold the plastic in the form of a solid sheet of the desired thickness by any of the well known methods now commonly employed in the manufacture of synthetic resin or plastic sheets, and then to break up such sheet into the desired size particles either by passing it through suitable crushing rolls, or sets of such rolls, or by cutting the sheet with slitting or chopping knives. Also, the plastic may be die extruded in the form of long rods or ribbons which may be subsequently cut to provide the flakes.

For inherent flexibility of the plastic flakes to permit the advantage previously stated, they should be relatively thin. We have found a flake thickness of about from three one thousandths (0.003") to thirty one thousandths (0.030") of an inch preferable for most purposes. However, we have employed plastic flakes as thin as one one thousandth (0.001") of an inch and as thick as fifty one thousandths (0.050") of an inch with good results. The thinner the flakes, the less weight of plastic will be required to obtain coverage, thus making for economy. Consequently, the thinner flakes are desirable. However, if the flakes are too thin pigmentation must be increased to obtain opacity. Also, the thinner the material, the more quickly it will be destroyed by progressive weathering. It is desirable that the flakes be not too thick because otherwise some of the advantages of flakes becomes lost, and the material will approach the characteristics of plastic granules. Such plastic granules, as previously stated, may be of a size and shape similar to other types of granules employed as surfacing for roofing.

As for the surface area of the flakes, we preferably have the flakes of such range in size that the larger flakes in any aggregate thereof will just pass a four (4) mesh and more desirable a ten (10) mesh screen, and all the flakes will be substantially retained on a sixty-five (65) mesh screen. The particles should not be much smaller than that corresponding to sixty-five (65) mesh; otherwise they may be too fine and thus lose the advantages of flakes. For extremely decorative effects, smaller size flakes are desirable in which case, the larger flakes in any aggregate thereof should just substantially pass a twenty (20) to thirty (30) mesh screen and be all substantially retained on a sixty-five (65) mesh screen. For some special decorative effects relatively large flakes may be employed, such as flakes having dimensions of up to one inch or even more across the face. However, the flake size stated is preferred for the usual run of roofing.

An important advantage of the plastic surfacing material of our invention is its relatively light weight. Compared to crushed mineral granules now commonly employed as surface covering for roofing, which require in the order of twenty-five (25) pounds of such granules to cover one hundred (100) square feet of roofing, about two (2) to five (5) pounds of our plastic surfacing material will cover the same area. This results in a material saving in freight, and also in handling of the material.

Another decided advantage of our plastic surfacing material lies in the fact that by virtue of the well known properties of resinous or plastic material employed by us, it can be readily and economically colored any desired shade merely by incorporation of suitable dyes or pigments therein; and the color will be clear through the body of the material, and not merely on the surface or in the region adjacent the surface. Thus, as the material is subjected to weathering, its color will remain substantially fast, which is difficult to obtain with mere surface coloring. In application of the plastic surfacing material to the roofing, particles of all of the same color may be employed in an aggregate thereof, or particles of different colors may be utilized in such aggregate to give a multi-colored effect, the same as with surface colored mineral granules.

Some types of mineral granules employed as surfacing for roofing are alkaline in their reaction, and consequently have an interfacial reaction with the asphalt surface coating of the roofing, similar to partial saponification. As a result, these granules sometimes become loose in the course of time and separate from the roofing. The plastic surfacing material of our invention does not have such alkaline reaction, and hence is not subject to such loosening effect. However, in many instances, and particularly with our preferred polystyrene plastic referred to hereinafter, the hot asphalt upon application of the plastic particles thereto, effects a slight etching of the surface of the plastic in contact therewith by an effect of mutual solution similar to an amalgamation. This tends to roughen such surface, and enhances adhesive union between the plastic and the asphalt coating.

Any suitable resinous material or plastic which will remain substantially solid at the maximum temperature to which the plastic may be subjected in use, may be employed to provide the surfacing material of our invention. In this connection, when the material is applied as a roofing surfacing over the usual asphalt coating on the roofing base, this is commonly done while such asphalt coating is still hot, so as to be readily adhesive, as was previously explained. Because of this, the plastic for this use, should be such as not to become materially softened at the temperature of the heated asphalt when the plastic is applied thereto, to the extent that the plastic will melt or otherwise lose its shape. However, slight softening of the plastic at the temperature of the heated asphalt is advantageous because it enhances bonding of the plastic to the asphalt, as was heretofore stated.

As was previously related, the temperature of the asphalt is approximately two hundred and fifty (250° F.) to three hundred and fifty degrees (350° F.) Fahrenheit when the plastic is applied thereto. Thereafter such temperature gradually becomes lower because the roofing is subsequently not subjected to such high temperature, and undergoes considerable inherent cooling. Therefore, when employed as surfacing for roofing, the softening point of the plastic may be in this temperature range as it would not heat up at once and melt, and the temperature continually falls lower. However, the plastic should be such that it does not become free flowing at the temperature of the heated asphalt at the time the plastic comes in contact therewith. Otherwise, the plastic could coalesce and form a film. Plastics having softening points in the temperature range of the heated asphalt, are entirely adequate under exposure to the sun when in use on the roofing because the maximum temperature which may develop on the surface of the roofing in service may only reach one hundred and seventy-five degrees Fahrenheit (175° F.).

Any suitable thermoplastic or thermosetting resin may be employed as the plastic. Our preferred plastic material is polystyrene. This material not only has superior weathering properties as well as satisfying the factors previously discussed, but it also has the decided commercial advantage of being relatively inexpensive. Polymethyl-methacrylate and polymethyl-acrylate resins also have superior weathering properties and are otherwise satisfactory, but they are more expensive than the polystyrene. Examples of other plastics which we have found satisfactory are polyparachlorostyrene, ethyl cellulose, cellulose acetate, cellulose acetate-butyrate, polyvinyl chloride type resins, orange shellac, melamine formaldehyde, polyethylene, and diallyl phthalate.

It is desirable that the characteristics of the plastics be such that they be solid at the temperatures they may encounter in use. In this connection, the polymers of resins that are soft or liquids at such temperatures would be obviously unsatisfactory. Usually the desired properties will be found in the polymers of resins of higher molecular weights rather than in those of lower molecular weights. With respect to our preferred polystyrene resin, we have found that the molecular weight of the resin should not be much below five thousand (5,000).

Although in the preferred embodiment of our invention, we utilize the plastic material as such as the surfacing material, the plastic may also be employed in the form of a suitable sheet material, such as paper, burlap or "Fiberglas" felt, thoroughly impregnated with the plastic, and divided into solid particles of desired size and shape.

Also, the plastic may be first applied to a suitable flexible carrier sheet such as burlap, cloth or asbestos paper, as a liquid coating composition or in relatively thin sheet form, so as to be integrally united to such carrier sheet and form a flexible laminated sheet structure consisting of the carrier sheet and a relatively thin continuous plastic coating layer thereon. After the plastic has solidified, such plastic layer may be suitably scored by any suitable cutting instrument to produce score lines over the entire surface area of the plastic and traversing each other, so that when the laminated sheet is sharply flexed, this will result in cracking apart of the plastic into individual contiguous particles. The carrier sheet of the laminated plastic sheet may then be adhesively united to the base sheet.

Figs. 3 and 4 illustrate the latter modification as applied to roofing comprising the usual bituminous saturated felt base 11 having asphalt under coating 12 covered with back finish 13, and asphalt surface coat 14 to which is adhesively united flexible carrier sheet 16 of an integral laminated structure consisting of such carrier sheet and exposed decorative relatively thin plastic surface coating or covering 17. This coating 17 is divided into individual contiguous particles 18 of the plastic by the aforementioned score lines 19 and subsequent cracking.

Although the decorative plastic particles of our invention have particular applicability as a surfacing material for roofing because of their weather resistant properties and the pleasing ornamental effects they produce, they may, as previously related, be applied to other base materials for creating decorative effects. For example, single or mixed colors of the plastic particles, either in the form of flakes or granules, may be applied as a surface coating to any suitable base material, such as paper, cloth, wall board, or paper board. These bases may be first coated with any suitable adhesive coating, such as animal glue, varnish, and phenolic resinous adhesives; and while the adhesive coating is still in adhesive state, the plastic particles can be then sprinkled thereon, with subsequent removal of the excess particles in the manner related with respect to their application to roofing.

Sheets thus produced may be employed for varied decorative effects. For example, the plastic coated paper may be employed to produce ornamental backgrounds in show windows and on theatrical stages, or for decorative packaging material. The plastic coated cloth may be employed for ornamental curtains; while the plastic coated wall board can be used as decorative walls in houses or other buildings.

Fig. 5 illustrates a decorative material of the character just related which comprises base sheet 21 having adhesive coating 22 to which is adhesively united plastic particles 23 in the form of flexible flakes.

The following are examples of illustrative embodiments of our invention, in which plastic particles are utilized as decorative coatings.

EXAMPLE 1.—ROOFING

| | Lbs. per 108 sq. ft. of material |
|---|---|
| Roofing felt | 13.50 |
| Asphalt saturant | 22.50 |
| Asphalt coating | 22.20 |
| Plastic flakes | 3.00 |
| Selvage (edge covering) 100 mesh ground sand | .15 |
| Back finish (mica schist) | 1.15 |
| | 62.50 |

*Plastic formula*

| | Lbs. |
|---|---|
| Polystyrene ("Styron R-1-K27") | 75.00 |
| Titanium dioxide pigment | 1.00 |
| Chromium oxide pigment | 3.00 |

These ingredients were milled together at about 300° F. on a set of milling rolls of the rubber mixer type, sheeted hot, and cooled between flat platens into sheet material having a thickness of approximately 0.003". This sheet material was then ground to pass through a 10 mesh and be retained on a 65 mesh "Tyler" standard screen.

In this and all subsequent examples, the temperature stated for producing the pigmented plastic is that which will cause sufficient softening thereof so that the pigment may be thoroughly incorporated therein. Such temperatures are not particularly critical but are set forth to give the temperatures actually employed. With respect to the milling rolls in this and subsequent examples, rubber mixer type rolls are preferred and were employed, although other suitable mixing means may be utilized. In all subsequent examples, where mesh size is referred to, "Tyler" standard screens were employed.

EXAMPLE 2.—ROOFING IN FORM OF SHINGLES

| | Lbs. per 165⅓ sq. ft. of material |
|---|---|
| Roofing felt | 21.00 |
| Asphalt saturant | 37.00 |
| Asphalt coating | 28.00 |
| Plastic flakes | 11.50 |
| Back finish (30 mesh sand) | 17.50 |
| | 115.00 |

*Plastic formula*

| | Lbs. |
|---|---|
| Polystyrene ("Styron R-1-K27") | 150.00 |
| Molybdate orange pigment | 7.50 |

These ingredients were milled together and otherwise handled as related with respect to the formula of Example 1, except that the final sheets were approximately 0.007" in thickness and such sheets were ground to pass a 4 mesh and be retained on a 28 mesh screen.

EXAMPLE 3.—ROOFING

| | Lbs. per 108 sq. ft. of material |
|---|---|
| Roofing felt | 13.50 |
| Asphalt saturant | 22.50 |
| Asphalt coating | 20.20 |
| Plastic flakes | 5.00 |
| Selvage (100 mesh sand) | .15 |
| Back finish (mica schist) | 1.15 |
| | 62.50 |

*Plastic formula*

| | Lbs. |
|---|---|
| Polyparachlorostyrene (polymerized "Q373") | 100.00 |
| Red iron oxide (70% to 85% $Fe_2O_3$) | 5.00 |

These materials were milled together at about 300° F. and formed into strips approximately 0.003" thick. The strips were then run through a hammer mill and ground to pass through a 10 mesh and be retained on a 65 mesh screen.

EXAMPLE 4.—ROOFING

| | Lbs. per 108 sq. ft. of material |
|---|---|
| Roofing felt | 11.25 |
| Asphalt saturant | 19.25 |
| Asphalt coating | 19.50 |
| Plastic flakes | 1.50 |
| Back finish (mica schist) | 1.00 |
| | 52.50 |

*Plastic formula*

| | Lbs. |
|---|---|
| Polystyrene ("XRS11450") | 75.00 |
| Titanium dioxide pigment | 2.00 |
| Chromium oxide pigment | 6.00 |

These ingredients were milled together at about 300° F., sheeted hot, and cooled between flat platens into sheet material having a thickness of about 0.0015". Such sheets were then ground to pass through a 20 mesh and be retained on a 48 mesh screen.

EXAMPLE 5.—ROOFING

| | Lbs. per 108 sq. ft. of material |
|---|---|
| Roofing felt | 13.50 |
| Asphalt saturant | 22.50 |
| Asphalt coating | 24.50 |
| Plastic flakes | 1.00 |
| Back finish (mica schist) | 1.30 |
| | 62.50 |

*Plastic formula*

| | Lbs. |
|---|---|
| Polymethyl-methacrylate ("Lucite") | 75.00 |
| Red iron oxide (70% to 85% $Fe_2O_3$) | 20.00 |

These ingredients were milled together at about 300° F., and sheeted into a sheet material having a thickness of approximately 0.001". Such sheet material was ground to pass through a 28 mesh and be retained on a 65 mesh screen.

EXAMPLE 6.—ROOFING

|  | Lbs. per 108 sq. ft. of material |
|---|---|
| Roofing felt | 13.50 |
| Asphalt saturant | 22.50 |
| Asphalt coating | 20.20 |
| Plastic particles | 15.00 |
| Selvage (100 mesh sand) | .15 |
| Back finish (mica schist) | 1.15 |
|  | 72.50 |

*Plastic formula*

|  | Lbs. |
|---|---|
| Ethyl cellulose ("N-100") | 100.00 |
| Tricresyl phosphate | 10.00 |
| Chromium oxide pigment | 6.00 |

Above ingredients were milled together at about 300° F., and extruded from a die into cylindrical pieces of about 0.028" in diameter. These pieces were cut off in lengths of about 0.075".

EXAMPLE 7.—ROOFING

|  | Lbs. per 112½ sq. ft. of material |
|---|---|
| Roofing felt | 17.60 |
| Asphalt saturant | 28.00 |
| Asphalt coating | 23.40 |
| Plastic flakes | 10.00 |
| Back finish (100 mesh sand) | 3.50 |
|  | 82.50 |

*Plastic formula*

|  | Lbs. |
|---|---|
| Cellulose acetate ("Tenite I") | 100.00 |
| Titanium dioxide pigment | 10.80 |
| Yellow ochre | 1.00 |
| Ultramarine blue | 0.25 |

These ingredients were milled together at about 300° F., and sheeted into sheets of about 0.010" thick. Such sheet material was then slit into strips ⅛" wide which were chopped into ⅛" squares. The above pigments in the proportions stated produced an ivory white color.

EXAMPLE 8.—ROOFING

|  | Lbs. per 108 sq. ft. of material |
|---|---|
| Roofing felt | 13.50 |
| Asphalt saturant | 22.50 |
| Asphalt coating | 20.20 |
| Plastic flakes | 5.00 |
| Selvage (100 mesh sand) | .15 |
| Back finish (mica schist) | 1.15 |
|  | 62.50 |

*Plastic formula*

|  | Lbs. |
|---|---|
| Polystyrene ("Styron R-1-K27") | 75.00 |
| Antimony black | 4.00 |

These materials were milled together at about 300° F., and formed between hot platens and cooled into sheets approximately 0.005" thick. The sheets were then ground by a hammer mill to pass through a 10 mesh and be retained on a 65 mesh screen.

EXAMPLE 9

Substantially same as Example 8, except that 19 lbs. of the antimony black was mixed with 75 lbs. of the polystyrene.

EXAMPLE 10.—ROOFING IN FORM OF SHINGLES

|  | Lbs. per 165⅓ sq. ft. of material |
|---|---|
| Roofing felt | 21.00 |
| Asphalt saturant | 37.00 |
| Asphalt coating | 29.50 |
| Plastic flakes | 10.00 |
| Back finish (20 mesh sand) | 17.50 |
|  | 115.00 |

*Plastic formula*

|  | Lbs. |
|---|---|
| Polymethyl-methacrylate ("Lucite") | 100.00 |
| Chromium oxide pigment | 5.00 |

These ingredients were milled together at about 300° F. and sheeted into sheet material of about 0.006" in thickness. The sheets were then ground to pass a 10 mesh and be retained on a 65 mesh screen.

EXAMPLE 11.—ROOFING

|  | Lbs. per 108 sq. ft. of material |
|---|---|
| Roofing felt | 13.50 |
| Asphalt saturant | 23.00 |
| Asphalt coating | 22.50 |
| Plastic granules | 12.00 |
| Selvage (30 mesh sand) | .50 |
| Back finish (mica schist) | 1.00 |
|  | 72.50 |

*Plastic formula*

|  | Lbs. |
|---|---|
| Polystyrene ("XRS 11450") | 125.00 |
| Yellow ochre (iron yellow) | 14.25 |

The polystyrene and ochre after having been mixed thoroughly at about 300° F., were sheeted out to a thickness of about 0.027". The sheeted material was then broken up and ground in a hammer mill; and the fraction passing through a 10 mesh and retained on a 28 mesh screen was utilized as the surfacing. A buff color was produced by the yellow ochre.

EXAMPLE 12.—ROOFING

|  | Lbs. per 108 sq. ft. of material |
|---|---|
| Roofing felt | 11.25 |
| Asphalt saturant | 19.25 |
| Asphalt coating | 22.50 |
| Plastic granules | 28.00 |
| Selvage (30 mesh sand) | .50 |
| Back finish (mica schist) | 1.00 |
|  | 82.50 |

*Plastic formula*

|  | Lbs. |
|---|---|
| Vinyl acetate-vinyl chloride copolymer, "VYNS Vinylite" | 75.00 |
| Zinc oxide | 8.00 |
| Ultramarine blue | .10 |

These materials were thoroughly mixed at about 300° F., and sheeted out into a thickness of about 0.036 inch. After grinding in a hammer mill, the fraction passing through a 6 mesh and retained on a 20 mesh screen was employed. An ivory color was produced by the pigments.

EXAMPLE 13.—ROOFING

|  | Lbs. per 108 sq. ft. of material |
|---|---|
| Roofing felt | 11.25 |
| Asphalt saturant | 19.25 |
| Asphalt coating | 18.00 |
| Plastic flakes | 3.00 |
| Back finish (mica schist) | 1.00 |
|  | 52.50 |

*Plastic formula*

|  | Lbs. |
|---|---|
| Flake orange shellac | 150.00 |
| Titanium dioxide pigment | 17.00 |

These substances were milled at about 250° F., and sheeted out to about 0.003" in thickness. After grinding in a hammer mill, flakes passing a 10 mesh and retained on a 65 mesh screen were employed.

EXAMPLE 14.—ROOFING

|  | Lbs. per 108 sq. ft. of material |
|---|---|
| Roofing felt | 13.50 |
| Asphalt saturant | 22.50 |
| Asphalt coating | 22.20 |
| Plastic flakes (impregnated paper) | 3.00 |
| Selvage (100 mesh sand) | .15 |
| Back finish (mica schist) | 1.15 |
|  | 62.50 |

*Plastic formula*

|  | Lbs. |
|---|---|
| Uncalendered soda pulp paper 0.004" thick | 27 |
| Melamine formaldehyde (#402 "Melmac") | 33 |
| Chromium oxide pigment | 3 |

The powdered "Melmac" and pigment were first thoroughly mixed, and then uniformly spread on the paper and pressed between metal platens at about 310° F. and 800 pounds per sq. inch pressure, for about 20 minutes. The resultant impregnated green colored paper was then broken in a hammer mill into flakes, and screenings ranging from 10 mesh to 48 mesh in size were employed.

EXAMPLE 15

Substantially the same as Example 14 except the following plastic formula was used:

|  | Percent by weight |
|---|---|
| Uncalendered soda pulp paper 0.004" thick | 40 |
| Melamine formaldehyde (#402 "Melmac") | 55 |
| Red iron oxide pigment (70% to 85% Fe₂O₃) | 5 |

The "Melmac" and iron oxide were first intimately mixed in powdered form, and then the same procedure was followed as in Example 14 to produce paper impregnated plastic flakes.

EXAMPLE 16.—ROOFING

|  | Lbs. per 108 sq. ft. of material |
|---|---|
| Asbestos felt | 16.20 |
| Asphalt saturant | 8.10 |
| Asphalt coating | 20.40 |
| Plastic flakes | 13.00 |
| Selvage (ground sand) | .15 |
| Back finish (mica schist) | 1.15 |
|  | 59.00 |

*Plastic formula*

|  | Lbs. |
|---|---|
| Polystyrene ("Styron R-1-K27") | 75.00 |
| Titanium dioxide pigment | 1.00 |
| Chromium oxide pigment | 3.00 |

Above ingredients were milled together at about 300° F., sheeted into sheets having a thickness of about 0.015", and ground to pass through a 10 and be retained on a 65 mesh screen.

EXAMPLE 17.—ROOFING

|  | Lbs. per 108 sq. ft. of material |
|---|---|
| Asbestos felt | 16.20 |
| Asphalt saturant | 8.10 |
| Asphalt coating | 21.92 |
| Plastic flakes | 15.00 |
| Selvage (ground sand) | .13 |
| Back finish (mica schist) | 1.15 |
|  | 62.50 |

*Plastic formula*

|  | Lbs. |
|---|---|
| Polyethylene ("Polythene") | 100.00 |
| Aluminum powder | 5.00 |

Above substances were milled together at about 250° F., and then die extruded in the form of strips of rectangular cross section, the strips being about 0.020" thick and 0.100" wide. Such strips were then cut crosswise into flakes of about 0.100" x 0.100" square and 0.20" thick.

EXAMPLE 18.—ROOFING

|  | Lbs. per 108 sq. ft. of material |
|---|---|
| Burlap | 6.00 |
| Asphalt saturant for burlap | 15.00 |
| Asphalt saturated rag felt backing for burlap adhesively united to burlap by asphalt | 10.80 |
| Asphalt coating | 24.00 |
| Plastic flakes | 3.00 |
| Back finish (mica schist) | 1.20 |
|  | 60.00 |

*Plastic formula*

|  | Lbs. |
|---|---|
| Diallyl phthalate | 150.00 |
| Chromium oxide pigment | 100.00 |
| Benzoyl peroxide ("Lucidol") | 8.00 |

A mixture of the above was heated to between 170° to 190° F. until slightly gelled. It was then pressed between plates to a thickness of about 0.004" at a pressure of about 150 lbs. per square foot. The resultant mass was then cured for about 2 hours at about 300° F. After curing, the material was flaked off the plates and was ground to a fineness of 10 to 65 mesh. To prevent sticking to the plates, they were coated with mineral oil lubricant.

EXAMPLE 19

The product of this example is roofing of the type illustrated in Figs. 3 and 4.

|  | Lbs. per 108 sq. ft. of material |
|---|---|
| Roofing felt | 13.50 |
| Asphalt saturant | 22.50 |
| Asphalt coating | 16.25 |
| Laminated covering comprising: |  |
|   Asbestos paper carrier sheet | 6.50 |
|   Size | .25 |
|   Plastic surfacing | 3.00 |
|  | 62.00 |

*Plastic formula*

|  | Lbs. |
|---|---|
| Polystyrene ("XRS 11450") | 112.00 |
| Titanium dioxide pigment | 1.50 |
| Chromium oxide pigment | 4.50 |

These ingredients were milled together at about 300° F. The resultant composition was sheeted to a thickness of about 0.004"; and such sheet was pressed at about 350° F. onto a sheet of 6 lb. (per 100 sq. ft.) sized asbestos paper to form a laminated sheet. The sizing was performed by saturating the paper with an 8% solution of polystyrene in xylol; and after drying of the solvent, the sheeted polystyrene was pressed on the carrier sheet as stated.

The laminated sheet was subjected to a scoring operation by cutting instruments to produce score lines over the entire surface of the plastic coating, at right angles and approximately 1/8" apart. Upon sharply flexing of the sheet, the plastic coating cracked apart to produce contiguous independent particles of the plastic in approximately 1/8" squares.

The laminated sheet was then adhesively secured to the adhesive asphalt coating on the roofing felt base, with the plastic particles forming the exposed decorative surface.

EXAMPLE 20

This example is similar to Example 19 except that instead of forming the laminated sheet by adhesively pressing a plastic sheet onto the carrier sheet, a coating of the pigmented plastic in solution was applied to the carrier sheet. After evaporation of the solvent, the dried solid coating was scored, and the scored lines broken as in Example 19.

The following plastic formula was employed:

| | Lbs. |
|---|---|
| Polystyrene ("Styron R-1-K27") | 12 |
| Chromium oxide pigment | 2 |
| Xylol (solvent for plastic) | 90 |

To obtain dispersion of the pigment in the polystyrene, these materials were thoroughly intermixed before hand at a temperature of about 300° F.

EXAMPLE 21.—ROOFING IN FORM OF SHINGLES

| | Lbs. per 165 1/3 sq. ft. of material |
|---|---|
| Roofing felt | 21.00 |
| Asphalt saturant | 37.00 |
| Asphalt coating | 33.50 |
| Plastic flakes (treated "Fiberglas") | 6.00 |
| Back finish (30 mesh sand) | 17.50 |
| | 115.00 |

*Plastic formula*

| | Lbs. |
|---|---|
| Fiberglas felt, 0.010" thick | 100.00 |
| Melamine formaldehyde (#402 "Melmac") | 180.00 |
| Chromium oxide pigment | 50.00 |

The melamine formaldehyde in powdered form was dry mixed with the pigment, and spread loosely and uniformly on the "Fiberglas" felt. The felt, and the plastic and pigment mixture thereon were then pressed at about 310° F. for about 20 minutes at about 500 pounds per sq. inch pressure. The resultant sheet, which was about 0.005" in thickness, was cut into small flakes of approximately 0.100" square, by mechanical cutters.

EXAMPLE 22

Same as Example 21 but powdered polystyrene was used instead of melamine formaldehyde; the plastic formula being:

| | Lbs. |
|---|---|
| "Fiberglas" felt | 100.00 |
| Polystyrene ("XRS 11450") | 180.00 |
| Chromium oxide pigment | 20.00 |

EXAMPLE 23.—ROOFING

| | Lbs. per 108 sq. ft. of material |
|---|---|
| Sheet asbestos saturated with coal tar pitch saturant | 16.20 |
| Coal tar pitch coating | 24.00 |
| Plastic flakes | 5.00 |
| Back finish (mica schist) | .80 |
| | 46.00 |

*Plastic formula*

A

| | Lbs. |
|---|---|
| Polyethylene ("Polythene") | 100.00 |
| Chromium oxide pigment | 5.00 |

B

| | |
|---|---|
| Polyethylene ("Polythene") | 100.00 |
| Molybdate orange pigment | 7.50 |

Formula A produced green flakes, while formula B produced orange flakes. The separate batches of polyethylene and color were each milled together at about 250° F., and the resultant composition rolled into sheets of approximately 0.005" in thickness. Such sheets were then cut into flakes approximately 1/8" square. The resultant green and orange flakes were then mixed together and applied to the coal tar pitch coating while it was still adhesive, as described previously.

Different colored flakes may be mixed together in any desired proportions, to give a desired combined color effect.

EXAMPLE 24

This example is illustrative of the product of Fig. 5.

| | Lbs. per 100 sq. ft. of material |
|---|---|
| Unbleached sulphite paper, sized | 3.33 |
| Adhesive | 2.00 |
| Plastic flakes | 5.00 |
| | 10.33 |

*Adhesive formula*

| | Per cent |
|---|---|
| Polyvinyl acetate, "VYHH. Vinylite" | 13.00 |
| 125 lb. chlorinated diphenyl, "Aroclor #1254" | 4.50 |
| Methyl ethyl ketone | 82.50 |

Plastic flakes of the type and thickness of Example 23 were employed, except the flakes were cut in assorted sizes varying from 1/10" square to 3/8" square. The two colors were blended as in Example 23 to obtain the desired color effect.

The adhesive was applied to the paper sheet by means of a conventional doctor blade in a layer approximately 0.024" thick. While still undried, and at the time its adhesiveness was of a high order, the plastic flakes were showered onto the still wet adhesive surface. Excess flakes not adhesively united were allowed to fall off the sheet, and the remaining adhesively united flakes were pressed onto the adhesive coating.

The above examples are merely illustrative of the types of decorative coatings that can be made with the plastic particles of my invention. Polystyrene is the preferred material for the reasons mentioned heretofore, but it is believed apparent that with the numerous plastics thus far developed and the practically unlimited possibilities of developments in the plastic field in the future, numerous plastics are available for the purposes of this invention, in addition to those specifically mentioned herein.

We claim:

1. Roofing material having a bituminous coating, and a decorative coating of flexible homogeneous plastic flakes adhesively united to said bituminous coating the plastic being selected from the group consisting of polystyrene, polymethyl-methacrylate, polymethyl acrylate, polyparachlorostyrene, polyvinyl chloride, polyethylene, and diallyl phthalate plastics, said flakes having a thickness of about one one-thousandth (0.001) to fifty one-thousandths (0.050) of an inch to give flexibility to the flakes to enable them to overlap and become adhesively embedded in the bituminous coating to produce substantially complete coverage, the flakes being of a size to substantially pass a four (4) mesh screen and be retained on a sixty-five (65) mesh screen.

2. Roofing material as set forth in claim 1 in which the plastic is polymethyl-methacrylate.

3. Roofing material having a bituminous coating, and a decorative coating of homogeneous polystyrene plastic flakes adhesively united to said bituminous coating in overlapping relationship; said flakes having a thickness of about one one-thousandth (0.001) to fifty one-thousandths (0.050) of an inch, to give flexibility to the flakes to enable them to overlap and become adhesively embedded in the bituminous coating to produce substantially complete coverage, said flakes. being of a size to substantially pass a four (4) mesh screen and be retained on a sixty-five (65) mesh screen.

4. Roofing material as set forth in claim 1 in which the plastic is polymethyl-acrylate.

5. Roofing material comprising a fibrous base saturated with bituminous material, a bituminous coating over said base, and a decorative coating of homogeneous plastic flakes adhesively united to said bituminous coating in overlapping relationship the plastic being selected from the group consisting of polystyrene, polymethyl-methacrylate, polymethyl acrylate, polyparachlorostyrene, polyvinyl chloride, polyethylene, and diallyl phthalate plastics, the flakes being individually colored uniformly throughout whereby the color will remain substantially fast as the flakes are subjected to weathering; said flakes having a thickness of about one-thousandth (0.001) to fifty one-thousandths (0.050) of an inch, to give flexibility to the flakes to enable them to overlap and become adhesively embedded in the bituminous coating to produce substantially complete coverage, said flakes being of a size to substantially pass a four (4) mesh screen and be retained on a sixty-five (65) mesh screen; and the amount of said flakes on said roofing material being about two (2) to five (5) pounds per one hundred (100) square feet of the material.

GERALD T. KURTZ.
FRANK O. GROCH, Jr.

REFERENCES CITED

The following references are of record in the file of this patent:

UNITED STATES PATENTS

| Number | Name | Date |
|---|---|---|
| 1,825,877 | Loetscher | Oct. 6, 1931 |
| 2,054,499 | Norman | Sept. 15, 1936 |
| 2,061,203 | Merritt | Nov. 17, 1936 |
| 2,143,946 | Hunter | Jan. 17, 1939 |
| 2,218,909 | Gill | Oct. 22, 1940 |
| 2,332,220 | Harshberger | Oct. 19, 1943 |
| 2,371,618 | Hanson | Mar. 20, 1945 |

FOREIGN PATENTS

| Number | Country | Date |
|---|---|---|
| 326,792 | Great Britain | 1930 |

OTHER REFERENCES

Ellis: Chemistry of Synthetic Resins (1935) vol. 1, page 250.